US009307337B2

(12) United States Patent
Fonseca, Jr. et al.

(10) Patent No.: US 9,307,337 B2
(45) Date of Patent: Apr. 5, 2016

(54) SYSTEMS AND METHODS FOR INTERACTIVE BROADCAST CONTENT

(71) Applicant: General Instrument Corporation, Horsham, PA (US)

(72) Inventors: Benedito J. Fonseca, Jr., Glen Ellyn, IL (US); Kevin L. Baum, Rolling Meadows, IL (US); Faisal Ishtiaq, Chicago, IL (US); Michael L. Needham, Palatine, IL (US)

(73) Assignee: ARRIS Enterprises, Inc., Suwanee, GA (US)

( * ) Notice: Subject to any disclaimer, the term of this patent is extended or adjusted under 35 U.S.C. 154(b) by 326 days.

(21) Appl. No.: 13/794,735

(22) Filed: Mar. 11, 2013

(65) Prior Publication Data

US 2014/0254806 A1 Sep. 11, 2014

(51) Int. Cl.

| | |
|---|---|
| ***H04R 29/00*** | (2006.01) |
| ***G06F 17/00*** | (2006.01) |
| ***G10H 1/36*** | (2006.01) |
| ***G10L 25/51*** | (2013.01) |
| *G10L 25/18* | (2013.01) |

(52) U.S. Cl.

CPC ............. *H04R 29/008* (2013.01); *G10H 1/368* (2013.01); *G10L 25/51* (2013.01); *G10H 2210/091* (2013.01); *G10H 2240/141* (2013.01); *G10H 2240/325* (2013.01); *G10L 25/18* (2013.01); *H04H 2201/90* (2013.01)

(58) Field of Classification Search

CPC .................... H04H 2201/90; G11B 20/00123; G06K 9/00496; H04R 29/008; G10H 1/368; G10H 2210/091; G10H 2240/141; G10H 2240/325; G10L 25/51; G10L 25/18

USPC ................ 381/56, 110, 122; 700/94; 704/231

See application file for complete search history.

(56) References Cited

U.S. PATENT DOCUMENTS

| | | | |
|---|---|---|---|
| 5,481,294 | A | 1/1996 | Thomas et al. |
| 5,804,752 | A | 9/1998 | Sone et al. |
| 7,333,864 | B1 | 2/2008 | Herley |
| 7,650,616 | B2 | 1/2010 | Lee |
| 7,672,843 | B2 | 3/2010 | Srinivasan et al. |
| 7,793,318 | B2 | 9/2010 | Deng |
| 7,853,438 | B2 | 12/2010 | Caruso et al. |
| 7,882,514 | B2 | 2/2011 | Nielsen et al. |

(Continued)

FOREIGN PATENT DOCUMENTS

| | | | |
|---|---|---|---|
| EP | 2083546 | A1 | 7/2009 |
| GB | 2397027 | A | 7/2004 |

(Continued)

OTHER PUBLICATIONS

PCT Search Report & Written Opinion, RE: Application #PCT/US2014/022165; dated Aug. 19, 2014.

(Continued)

*Primary Examiner* — Vivian Chin
*Assistant Examiner* — Douglas Suthers
(74) *Attorney, Agent, or Firm* — Stewart M. Wiener

(57) ABSTRACT

Devices and methods for scoring viewer's interactions with content broadcast on a presentation device by processing at least one audio signal received by a microphone proximate the viewer and the presentation device, to generate at least one audio signature, which is compared to at least two different reference audio signatures.

22 Claims, 6 Drawing Sheets

(56) References Cited

U.S. PATENT DOCUMENTS

| | | | | |
|---|---|---|---|---|
| 7,928,307 | B2 | 4/2011 | Hetherington et al. | |
| 7,930,546 | B2 | 4/2011 | Rhoads et al. | |
| 8,015,123 | B2 | 9/2011 | Barton et al. | |
| 8,076,564 | B2 | 12/2011 | Applewhite | |
| 2002/0072982 | A1 | 6/2002 | Barton et al. | |
| 2006/0009979 | A1* | 1/2006 | McHale et al. | 704/270 |
| 2008/0200224 | A1 | 8/2008 | Parks | |
| 2009/0265163 | A1 | 10/2009 | Li et al. | |
| 2011/0003638 | A1 | 1/2011 | Lee et al. | |
| 2011/0273455 | A1 | 11/2011 | Powar et al. | |
| 2012/0059845 | A1 | 3/2012 | Covell et al. | |
| 2012/0195433 | A1 | 8/2012 | Eppolito et al. | |
| 2014/0254807 | A1 | 9/2014 | Fonseca, Jr. et al. | |

FOREIGN PATENT DOCUMENTS

| | | | |
|---|---|---|---|
| GB | 2483370 | A | 3/2012 |
| WO | 95/17054 | A1 | 6/1995 |
| WO | 99/27668 | A1 | 6/1999 |
| WO | 02/11123 | A2 | 2/2002 |
| WO | 2003/091899 | A2 | 11/2003 |
| WO | 2005/113096 | A1 | 12/2005 |
| WO | 2005118094 | A1 | 12/2005 |
| WO | 2006/115387 | A1 | 11/2006 |

OTHER PUBLICATIONS

PCT Search Report & Written Opinion, RE: Application #PCT/US2014/022166; dated Jul. 23, 2014.

B. Andrassy, "Recognition Performance of the Siemens Front-end with and without Frame Dropping on the Aurora 2 Database", Eurospeech 2001—Scandinavia, pp. 193-196.

M. Park, et al., "Frequency-Temporal Filtering for a Robust Audio Fingerprinting Scheme in Real-Noise Environments", ETRI Journal, vol. 28, No. 4, Aug. 2006, pp. 509-512.

S. Baluja, et al., "Waveprint: Efficient wavelet-based audio fingerprinting." Pattern Recognition, vol. 41, No. 11 (2008), pp. 3467-3480.

Red Karaoke, "Red Karaoke: sing with your iPhone, Android smartphone, or Windows Phone", URL: www.redkaraoke.com/apps/mobile, accessed Jun. 24, 2013.

Harmonix Music Systems, Inc., "About Harmonix", URL: www.rockband.com/about, accessed Jun. 25, 2013.

Crunchbase, "TuneWiki", URL: www.crunchbase.com/company/tunewiki, accessed Jun. 25, 2013.

Informer Technologies, Inc., "Canta", URL: www.canta.software.informer.com, accessed Jun. 25, 2013.

IEENG Solution, "4Lyrics Lite—Android Apps on Google Play", URL: play.google.com/store/apps/details?id=it.ieeng.lyrics&hl=en, accessed Jun. 25, 2013.

Chaumet Software, "CANTA: Learn to sing in tune", URL: www.singintune.org, accessed Jun. 25, 2013.

Informer Technologies, Inc., "FollowMe—Software Informer", URL: www.followme.software.informer.com, accessed Jun. 25, 2013.

Musixmatch, "musiXmatch—The World's Largest Lyrics Catalog", URL: www.musixmatch.com, accessed Jul. 1, 2013.

Yahoo!, Inc., "IntoNow—Connect with your friends around the shows you love", URL: www.intonow.com/ci, accessed Jun. 26, 2013.

Yahoo!, Inc., "IntoNow—Android Apps on Google Play", URL: play.google.com/store/apps/details?id=com.intonow&hl=en, accessed Jun. 26, 2013.

Red Karaoke, "RedKaraoke, the karaoke machine for iPhone, iPod touch and iPad on the iTunes app store", URL: itunes.apple.com/us/app/red-karaoke-karaoke-machine/id452332418?mt=8, accessed Jun. 24, 2013.

Konami Digital Entertainment, "Konami Digital Entertainment, Inc. : Karaoke Revolution", URL: www.konami.com/games/karaoke-revolution, accessed Jun. 25, 2013.

Tunewiki, Inc., "TuneWiki Lyrics Apps", URL: www.tunewiki.com/apps, accessed Jun. 25, 2013.

Musixmatch, "musiXmatch Lyrics Player—Android Apps on Google Play", URL: play.google.com/store/apps/details? id=com.musixmatch.android.lyrify, accessed Jul. 1, 2013.

Shazam Entertainment Ltd., "Shazam for iPhone, iPod touch and iPad on the iTunes App Store", URL: itunes.apple.com/us/app/shazam/id284993459?mt=8, accessed Jun. 25, 2013.

Shazam Entertainment Ltd., "Introducing Shazam Player", URL: www.shazam.com/music/web/productfeatures.html?id=668, accessed Jun. 24, 2013.

Macworld, "Shazam Player", URL: www.macworld.com/product/1177564/shazam-player.html, accessed Jun. 25, 2013.

Xitona Software, "Singing Tutor Product—Xitona Software", URL: www.xitona.com/singingtutor.html, accessed Jun. 25, 2013.

Soundhound, Inc., "SoundHound for iPhone, iPod touch and iPad on the iTunes App Store", URL: itunes.apple.com/us/app/soundhound/id355554941?mt=8, accessed Jun. 26, 2013.

Soundhound Inc., "About Us", URL: www.soundhound.com/index.php?action=s.about, accessed Jun. 26, 2013.

Stingray Digital Media Group, "The Karaoke Channel—The Ultimate Karaoke Experience", URL: www.thekaraokechannel.com, accessed Jun. 21, 2013.

Stingray Digital Media Group, "The Karaoke Channel—Karaoke for Mobile", URL: www.thekaraokechannel.com/mobile, accessed Jun. 26, 2013.

Stingray Digital Media Group, "The Karaoke Channel App for Smart TVs", URL: www.thekaraokechannel.com/on-tv/smart-tv-app.html, accessed Jun. 26, 2013.

Stingray Digital Media Group, "The Karaoke Channel Video on Demand", URL: www.thekaraokechannel.com/on-tv/video-on-demand.html, accessed Jun. 26, 2013.

Tunewiki, Inc., "TuneWiki—Lyrics for Music—Android Apps on Google Play", URL: play.google.com/store/apps/details?id=com.tunewiki.lyricplayer.android&hl=en, accessed Jun. 25, 2013.

Maxdroid, "Android Karaoke—Sing-Along", URL: play.google.com/store/apps/details?id=com.sadi, accessed Jun. 17, 2013.

Maxdroid, "Android Karaoke—Sing-Along", URL: www.appbrain.com/app/android-karaoke-sing-along/com.sadi, accessed Jun. 17, 2013.

Seven45 Studios, "Home | Soulo Karaoke", URL: www.soulo.com, accessed Jul. 1, 2013.

Seven45 Studios, "Soulo Karaoke", URL: itunes.apple.com/us/app/soulo-karaoke/id456339499?mt=8, accessed Jul. 1, 2013.

A. Hyvärinen, et al. Independent Component Analysis. New York: J. Wiley & Sons, Inc., 2001.

* cited by examiner

SYSTEMS AND METHODS FOR INTERACTIVE BROADCAST CONTENT

CROSS-REFERENCE TO RELATED APPLICATIONS

None

BACKGROUND OF THE INVENTION

The subject matter of this application generally relates to systems and methods that engage persons to interact with broadcast content, such as television advertising.

Much of content that is broadcast to viewers relies on advertising revenue for continued operation, and in turn, businesses purchasing advertising time rely upon viewers to watch advertisements so that advertised products and services can gain consumer recognition, which ultimately boosts sales for advertisers. Many viewers, however, are at best ambivalent towards commercials, if not hostile toward them. For example, many viewers may not pay attention to commercial content, may leave the room during commercials, etc. Although broadcasters attempt to draw viewers' attention towards commercials using techniques such as increasing the sound level of commercials, this often leads viewers to simply mute the television during commercials.

Viewer antipathy to commercial content is sufficiently pervasive that many manufacturers of digital video recorders or other devices that permit users to time-shift broadcast content include functionality that suspends recording during commercials, or otherwise erases commercials after recording. Thus, advertisers and broadcasters attempt to find more effective ways to induce viewers to watch commercial content, in some instances proposing schemes that would pay viewers to watch commercials, provide credits used towards the monthly cost of broadcast service, or otherwise give the viewer something of value in exchange for voluntarily watching commercials.

For the most part, such efforts to increase viewers' interest in commercials have been ineffective. Therefore, there is a need for improved systems and methods that draw viewers' interest toward commercial content.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Many viewers of modern broadcast display systems view programming content with the assistance of a mobile electronic device, such as a tablet or a PDA. As one example, while a person is watching a broadcast television program, the user may use the mobile device to discover additional information about what is watched, e.g. batter statistics in a baseball game, fact-checking a political debate, etc. As another example, many applications for such tablets, PDAs, or other electronic devices allow users to use their mobile device as an interface for their entertainment system by accessing programming guides, issuing remote commands to televisions, set-top boxes, DVRs, etc.

To achieve this type of functionality, such mobile devices are usually capable of connection to a WAN, such as the Internet, or otherwise are capable of connection to a remote server. The present inventors realized that through this connection to remote servers, such devices could be used to interact with any programming displayed to the user, such as commercial advertising, in a manner enjoyable to the user. For example, several popular television programs present ongoing musical or other talent competitions in an elimination-style format over the course of a programming season, e.g. America's Got Talent, American Idol, etc. Given that the viewing audience of this type programming is focused on amateur musical performances, one effective mechanism to increase viewer's attention upon commercial content might be to somehow allow viewers to interact musically with that commercial content in a manner that would score their own performance. Such interactivity could, of course, be extended beyond commercials appearing in reality-style musical contest programming, as viewers could find musically-interactive commercial content enjoyable in any viewing context. Also, such interactivity could also be extended to broadcast content that is not a commercial, e.g. an introductory song in the introduction to a television show, and could also be extended to purely audio content such as a radio broadcast, and in this vein, any reference in this disclosure to a "viewer" should be understood as encompassing a "listener" and even more broadly as encompassing a consumer of any audio, visual, or audiovisual content presented to a user. Similarly, any reference to a "commercial" should be understood as also pertaining to other forms of broadcast content, as explained in this disclosure. It should also be understood that while the present disclosure is illustrated with respect to musical content, similar interactions could also take place with non-musical broadcast content, e.g. spoken slogans or catch-phrases appearing in a commercial, or other broadcast contexts.

Figure 1:
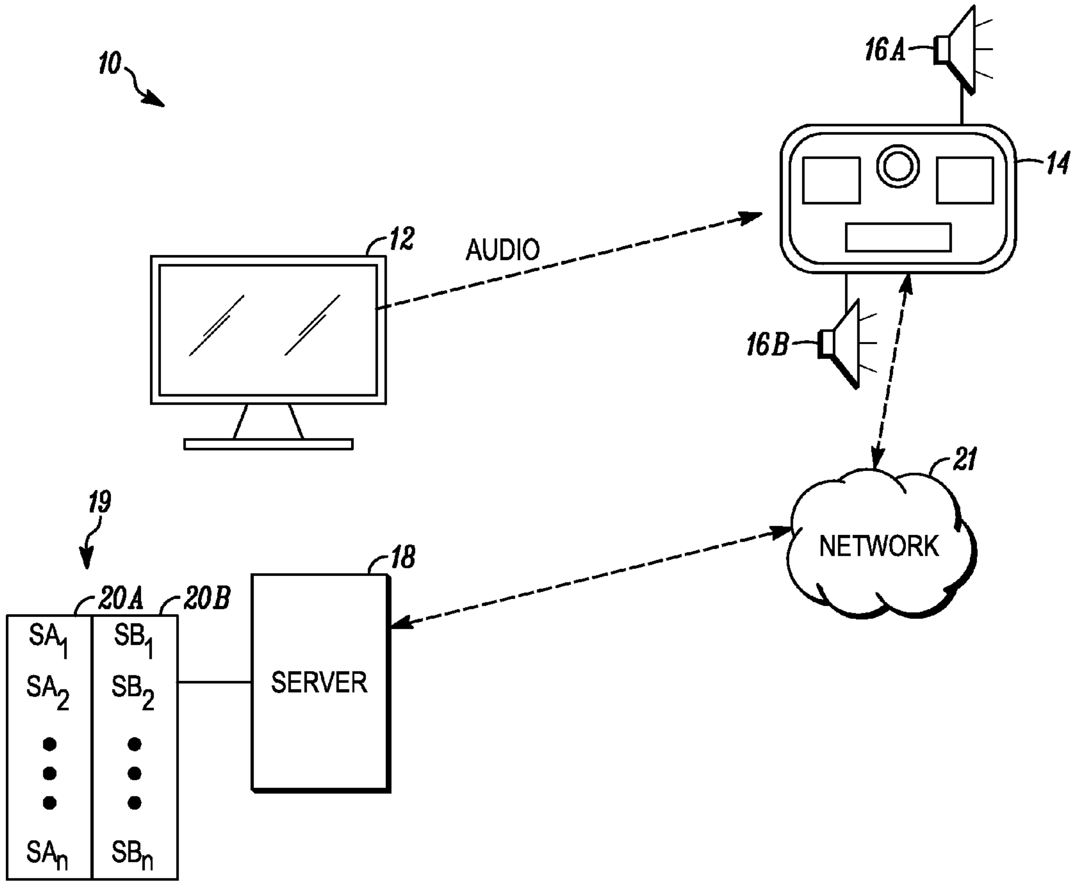
FIG. 1 shows an exemplary system that allows a user to interact with programming displayed on a television, using a mobile device operatively connected to a remote server through a network.

FIG. 1 broadly shows a system 10 that permits a user to interact with content displayed on a display 12 using a mobile device 14. The display 12 may be a television or may be any other device capable of presenting audiovisual content to a user, such as a computer monitor, a tablet, a PDA, a cell phone, etc. Alternatively, the display 12 may be a radio or any other device capable of delivering audio of broadcast content, such as a commercial. The mobile device 14, though depicted as a tablet device, may also be a personal computer, a laptop, a PDA, a cell phone, or any other similar device operatively connected to a computer processor as well as the microphone 16*a* and the optional microphone 16*b*. In some instances, a single device such as a tablet may double as both the display 12 and the remote device 14. The mobile device 14 may be operatively connected to a remote server 18 through a network 21.

The remote server 18 may be operatively connected to a database storing two sets of reference audio signatures 20*a* and 20*b*. The reference audio signatures within the first set 20*a* each uniquely characterize a respective commercial available to be shown on the display 12, where the commercial includes one or more songs or other musical tunes to which a viewer who sees the commercial may sing along, hum along, etc. The reference audio signatures within the second set 20*b* each preferably uniquely characterize an audio signal of an individual singing, humming, etc. the corresponding songs within one of the commercials characterized in the set 20*a*. In other words, for each of one or more commercials that may be shown on the display 12, there exists at least two corresponding reference audio signatures in the database 19: a first reference audio signature in the set 20*a* that uniquely characterizes the audio of the commercial itself, and at least one other signature that uniquely characterizes an audio sample or signal of a person singing (or humming etc) along to a song within the commercial. In this context, the term "uniquely" refers to the ability to distinguish between reference signatures in the database, meaning that each reference audio signature of a commercial, for example, uniquely identifies that reference audio signature from those of other commercials in the database. The server 18 may preferably be operated either by a provider of advertising content to be displayed on the display 12, or may be operated by a third-party service provider to television advertisers. Furthermore, the signatures in the sets 20*a* and 20*b* are preferably updated over time to reflect changing advertising content.

The audio signature in the set 20*a* and the corresponding audio signature in the set 20*b* from a person singing along to the song within the commercial may, in many instances, be significantly different. For instance, the audio signature in the set 20*a* may have been generated from a song in a commercial that contains three male singers, a guitar, drums, and a violin; and the audio signature in the set 20*b* may have been generated from a single male singer. Moreover, the set 20*b* may contain multiple audio signatures, each corresponding to a common audio signature in the set 20*a*. For instance, the set 20*b* may contain an audio signature generated from a female adult singing along, another audio signature generated from a male adult singing along, and another audio signature generated from a child singing along.

It should be understood that an audio signature may also be referred to as an audio fingerprint, and there are many ways to generate an audio signature. More generally, any data structure associated with an audio segment may form an audio signature. Although the term audio signature will be used throughout this disclosure, the invention applies to any data structure associated with an audio segment. For instance, an audio signature may also be formed from any one or more of: (1) a pattern in the spectrogram of the captured audio signal; (2) a sequence of time and frequency pairs corresponding to peaks in the spectrogram; (3) sequences of time differences between peaks in frequency bands of the spectrogram; and (4) a binary matrix in which each entry corresponds to high or low energy in quantized time periods and quantized frequency bands. Even the PCM samples of an audio segment may form an audio signature. Often, an audio signature is encoded into a string to facilitate the database search by the server.

The mobile device 14 preferably includes two microphones 16*a* and 16*b*. The microphone 16*a* is preferably configured to receive audio primarily from a direction away from a user holding the device 14, i.e. a direction towards the display device 12, while the microphone 16*b* is preferably configured to receive audio from a user holding the mobile device 14. The mobile device 14 preferably hosts an application that downloads from the server the first set 20*a* of reference audio signatures and includes a process that, once instantiated, permits the mobile device to receive an audio signal from the television, primarily from microphone 16*a*, and an audio signal from the user, primarily from microphone 16*b*, and convert each to respective first and second query audio signatures. The first query audio signature, representative of the commercial as a whole, is compared to the reference signatures of the first set 20*a*, earlier downloaded from the server, both to identify which commercial is being watched, and once identified, to synchronize the first and second query audio signatures to the signature in the first set 20*a* identified as the one being watched. Unless stated otherwise, in the disclosure and the claims, the term "synchronize" is intended to mean establishing a common time base between the signals, audio signatures etc, being synchronized. Once identification and synchronization occurs, the mobile device 14 transmits the second query audio signature to the server 18, preferably along with both identification information of the reference signature in the set 20*a* to which the second query audio signature is associated, as well as synchronization information. With this information, the server 18 may then retrieve the relevant reference audio signature in the set 20*b* that corresponds to the query audio signature of the viewer singing (or humming, etc.) and compare the two to generate a score that, not only reflects whether the viewer is singing in the proper pitch and beat, but also whether the viewer's performance is properly timed with the music of the commercial. The score may also indicate to what extent the viewer is singing with the proper intonation or emphasis as the singers of the commercial. The server 18 then preferably returns the score to the mobile device 14. Alternatively, the mobile device 14 downloads the set 20*b* of signatures, compares the second query audio signature and the relevant audio signature in the set 20*b*, and generates the score. As used in this specification and in the claims, and unless specifically stated otherwise, the term "score" refers to any rating, quantitative or otherwise.

Figure 2:
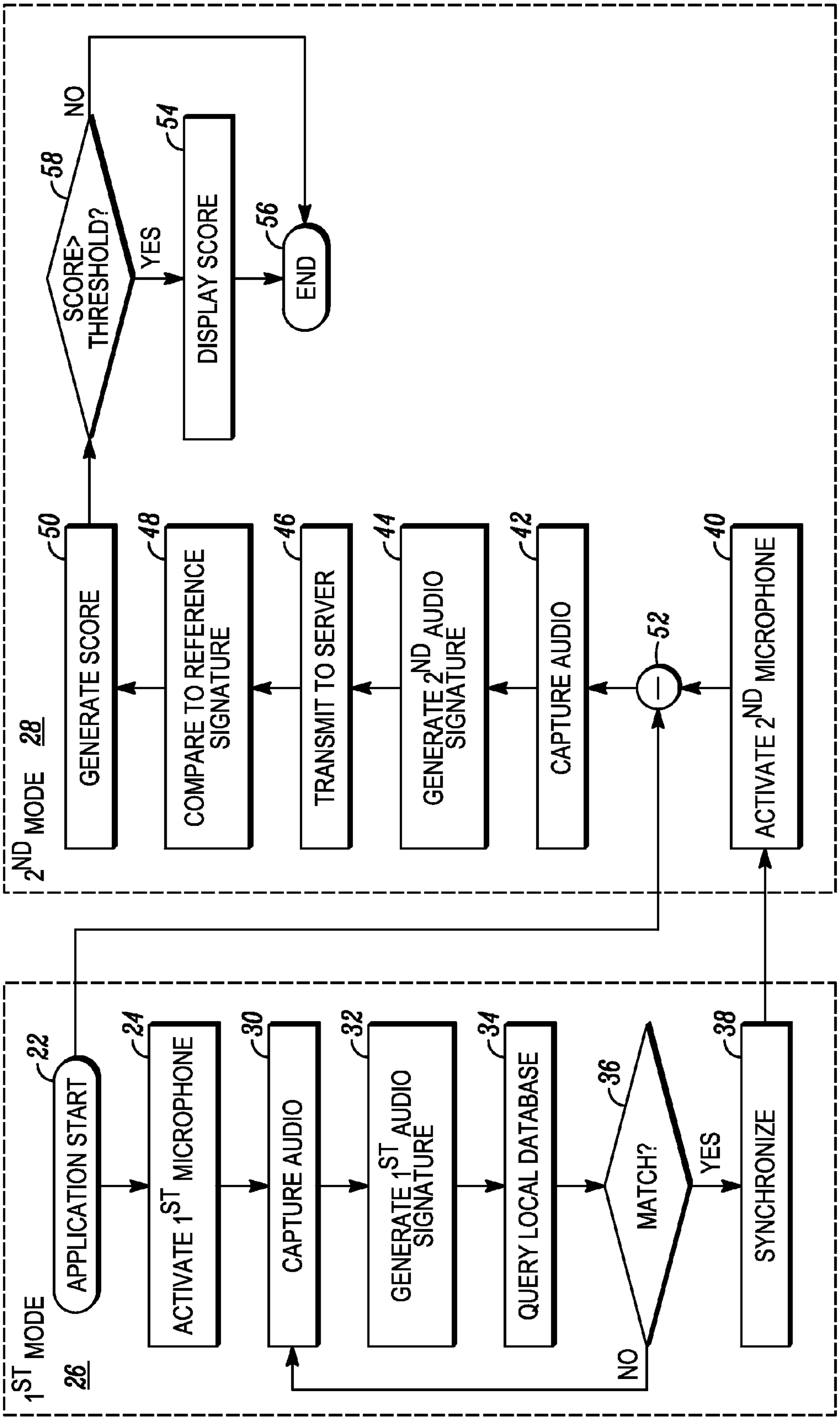
FIG. 2 shows a flowchart of a first technique, using the system of FIG. 1, for receiving audio from a user viewing interactive content and generating a response based on that audio.

FIG. 2 illustrates one exemplary process by which the system shown in FIG. 1 may allow a user to interact with a displayed advertisement by singing along to a song in the commercial, and receive a score. Specifically, a viewer watches the display 12 when one of the interactive commercials having signatures stored at the server 18 is displayed on the display 12, and the displayed commercial includes a song such as a segment of a popular track by the Talking Heads. At that time, the viewer may either recognize the commercial as an interactive one, or may be prompted by some icon within the commercial itself notifying the viewer that the commercial is interactive, after which the user starts 22 an application that activates 24 the microphone 16*a* to receive audio from the display 12 and open a communication channel to the server 18. The mobile device 14 then enters a first mode 26 that captures 30 the audio signal from the microphone 16*a* and generates 32 a first query audio signature. The mobile device 14 then may preferably query 34 the reference signatures in the set 20*a* that have been previously downloaded from the server 18, to determine 36 whether a matching signature is present in the set 20*a*. If a match is not found, the mobile device 14 may continue to capture audio and generate further query audio signatures until a match is found or some preset time elapses. If a match is found, the mobile device 14 may begin to synchronize 38 audio while entering a second mode 28 in which the second microphone 16*b* is activated 40, so as to capture 42 audio and generate 44 a second query audio signature. The synchronization in the step 38 may be achieved, for example, by specifying a temporal offset, from a reference location in the reference audio signature of the set 20*a*, at which the query audio signature begins (expressed by, e.g. video frame number, time from start, etc). Techniques that synchronize audio signals using audio signatures are disclosed in co-pending application Ser. No. 13/533,309 filed on Jun. 26, 2012, the disclosure of which is incorporated by reference in its entirety.

As indicated above, once synchronization is achieved based on identification of a commercial presently playing, the mobile device 14 may switch to a second mode of operation 28 that activates the second microphone 16*b* to receive an audio signal of the viewer, who may be singing along etc. to the track playing in the commercial. Preferably, the first microphone 16*a* is also active, as the microphone 16*a* may still be used to capture audio that maintains or refines synchronization, particularly during periods where there is no audio or low-energy audio from the viewer signing along to the commercial. Moreover, microphone 16*b* will still likely pick up audio from the display 12, and thus the audio from the microphone 16*a* may be used in a subtraction operation 52 to at least partially remove the audio coming from the display 12 from the viewer's audio signal received by the microphone 16*b*, so that the latter primarily represents audio of the user singing, humming etc. In some embodiments, while the microphone 16*b* is activated and operation has switched to the second mode, the audio of the microphone 16*a* may have less amplification than that of microphone 16*b*.

The device 14 may then generate 44 the second query audio signature, of the user's performance, and transmit 46 the audio signature to the server 18, along with information such as a numerical code that identifies which commercial the second query signature is synchronized with, along with synchronization information such as a temporal offset. The server 18 may then use this information to compare 48 the second query audio signature to the reference audio signature in the set 20*b* that corresponds to the commercial that the server 18 is now synchronized with. This comparison may be used to generate 50 a score that represents how well the user is singing along to the commercial. Optionally, the score may be compared 58 to a threshold in a decision step to determine whether there is at least a sufficient similarity to warrant a conclusion that the viewer is trying to sing along to a displayed commercial. If the threshold is not met, the process may end 56. If the threshold is met, or if no threshold step 58 is applied, the score may be sent to the mobile device 14 and displayed 54 to the user. The score may be displayed 54 in any appropriate manner, e.g. by a numerical score, the length of a bar, the angle of a needle, etc. In one embodiment, the system 10 may continuously synchronize to a displayed commercial using signatures representing segments of a commercial's audio, and segments of a user's performance, such that the score displayed 54 to the user may fluctuate temporally as the user's performance during a commercial improves or worsens. Moreover, in some embodiments, the performance score may be optimized for partial song scoring in the event that a user has not started to sing until the middle of a song, which might negatively affect the score, particularly if the song is short and not represented in the set 20*b* by multiple sequential segments. The application may therefore include algorithms that estimate the start and stop times of the user singing and only compute the score for that time period. For example, audio energy from the microphone 16*b* could be processed to determine the start and end times of the viewer's singing. Alternatively, the score generated in step 50 is stored in a database that contains the score from other users who also sang along to the commercial.

In some embodiments, the mobile device 14 periodically switches between the first mode 26 and the second mode 28. While in the first mode 26, the first microphone 16*a* is activated and the second microphone 16*b* is deactivated; while in the second mode 26, the second microphone 16*b* is activated and the first microphone 16*a* is deactivated.

Figure 3:
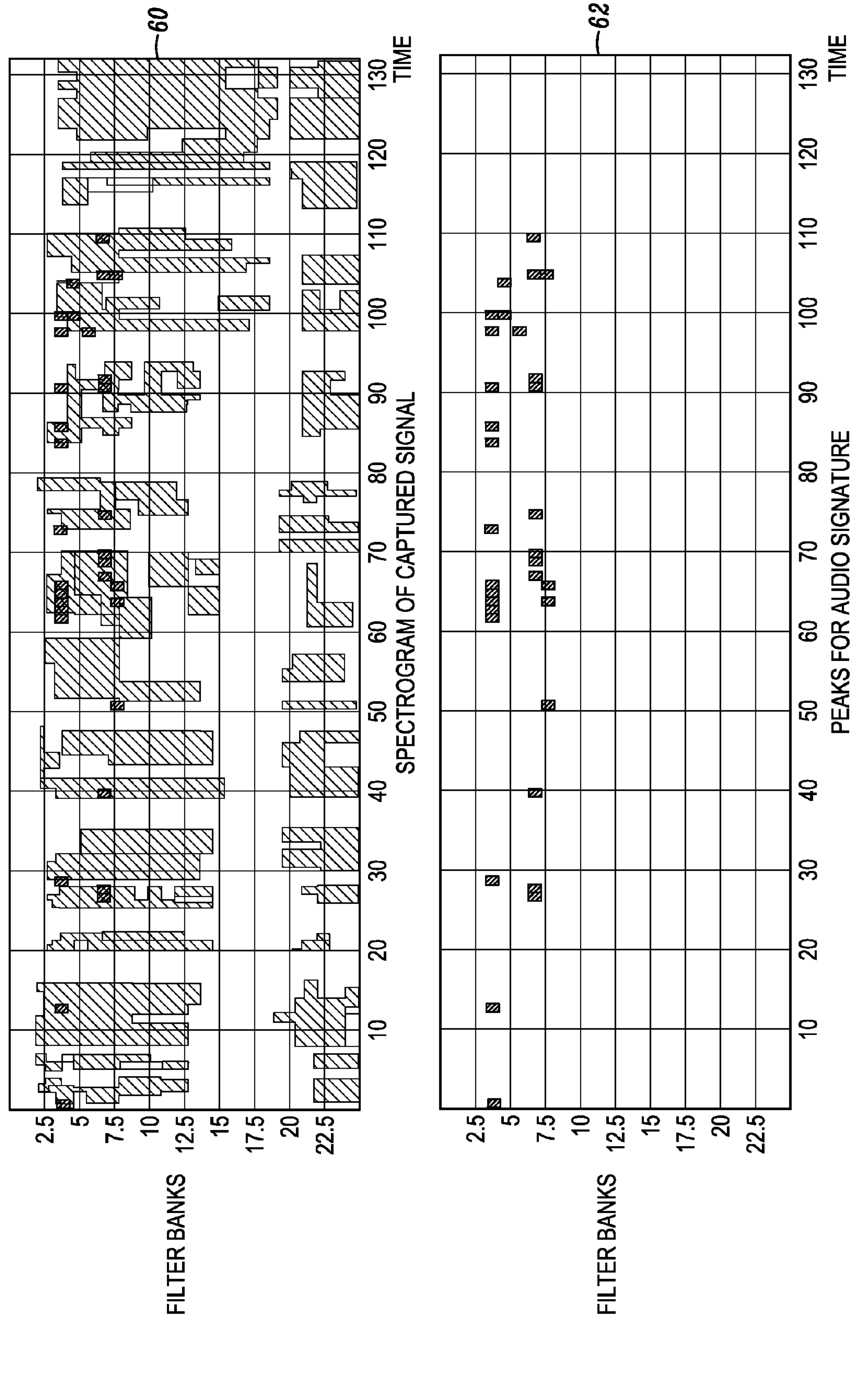
FIG. 3 shows a spectrogram of an audio segment captured by a mobile device, along with an audio signature generated from that spectrogram.
Figure 4:
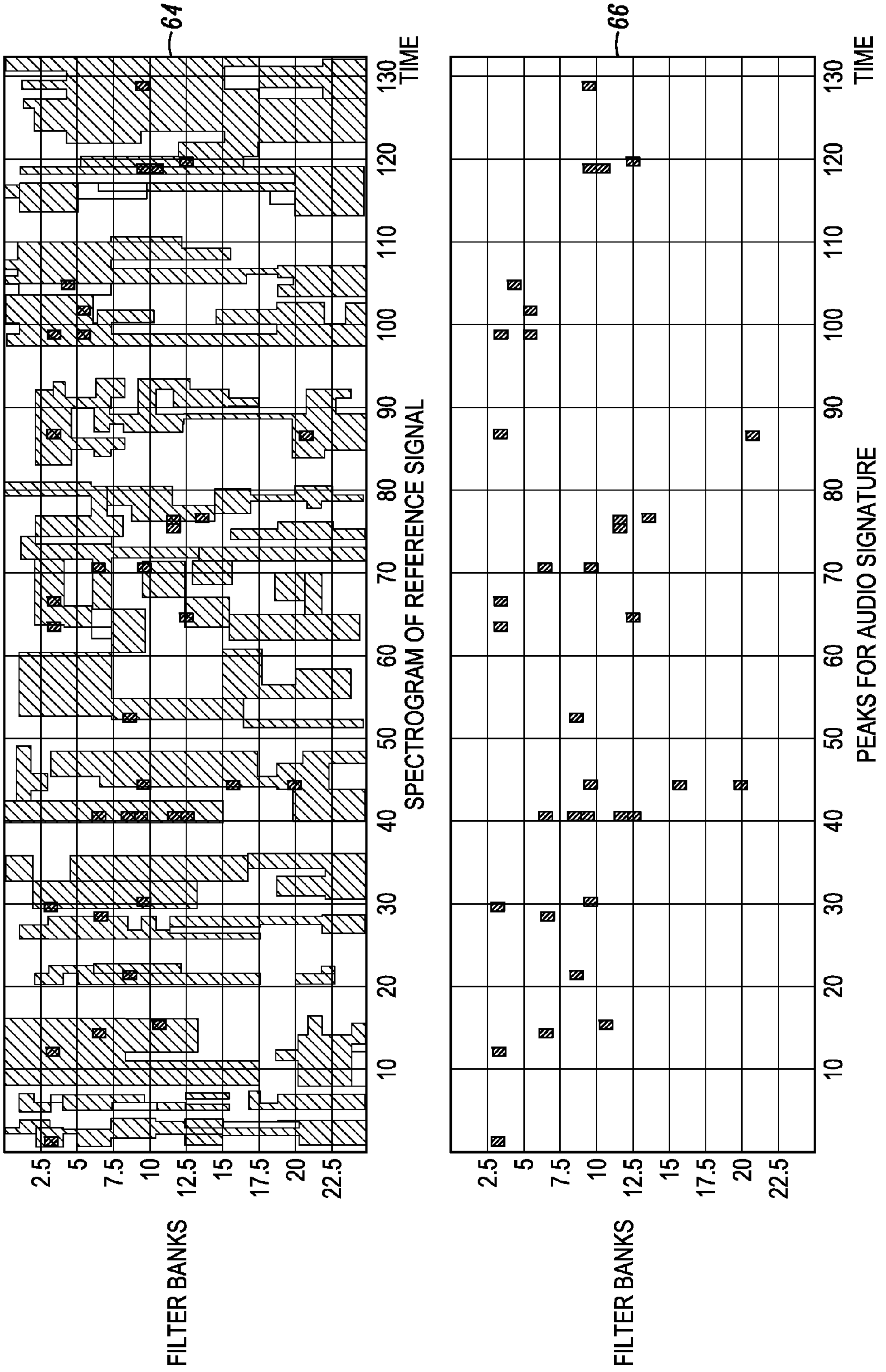
FIG. 4 shows a reference spectrogram of the audio segment of FIG. 3, along with an audio signature generated from the reference spectrogram.
Figure 5:
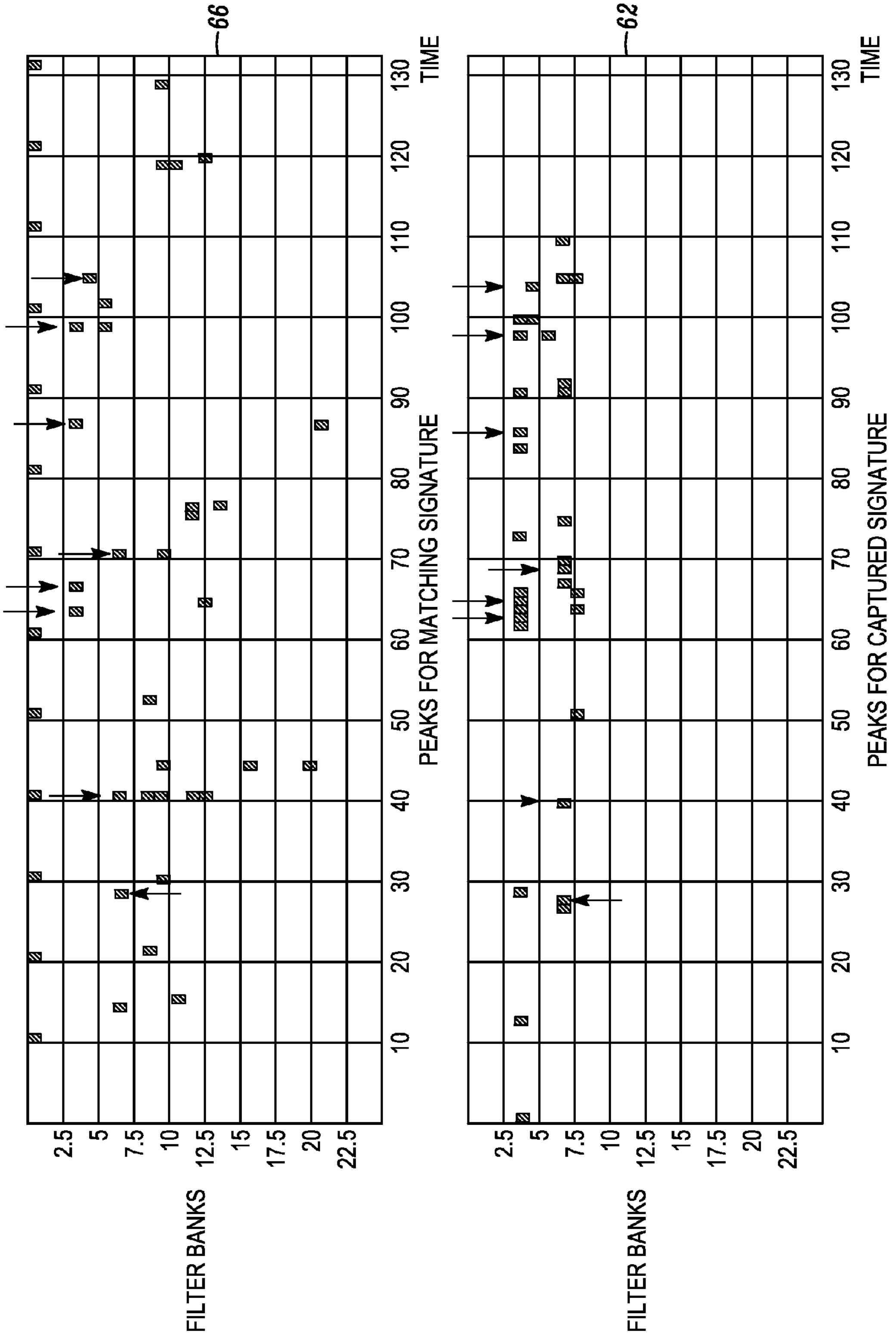
FIG. 5 shows a comparison between the audio signatures of FIGS. 3 and 4.

FIGS. 3-5 generally illustrate one example of how the system 10 may generate and match audio signatures representing either the audio of the commercial, or the audio of a person singing etc. along with a commercial. In what follows, the audio signature generation and matching procedure used to identify and synchronize the content of display 12 uses the same core principles as the audio signature generation and matching procedure used to generate the score of the viewer and the only difference between these steps is the underlying parameters used by the common core algorithm. It should be noted, however, that the procedure to identify the content and the procedure to score the viewer may use completely different audio signature generation and matching procedures. An example for this later case is one in which the steps 32 and 34 of identifying and synchronizing content would use a signature generation and matching procedure suitable for low signal-to-noise ratio (SNR) situations, and the steps 48 and 50 of generating the viewer's score would use a signature generation and matching procedure suitable for voice captures.

Once either or both of the microphones 16*a* and 16*b* have been activated, and audio is being captured, a spectrogram is approximated from the captured audio over a predefined interval. For example, let S[f,b] represent the energy at a band "b" during a frame "f" of a signal s(t) having a duration T, e.g. T=120 frames, 5 seconds, etc. The set of S[f,b] as all the bands are varied (b=1, . . . , B) and all the frames (f=1, . . . , F) are varied within the signal s(t), forms an F-by-B matrix S, which resembles the spectrogram of the signal. Although the set of all S[f,b] is not necessarily the equivalent of a spectrogram because the bands "b" are not Fast Fourier Transform (FFT) bins, but rather are a linear combination of the energy in each FFT bin, for purposes of this disclosure, it will be assumed either that such a procedure does generate the equivalent of a spectrogram, or some alternate procedure to generate a spectrogram from an audio signal is used, which are well known in the art.

Using the generated spectrogram from a captured segment of audio, an audio signature of that segment may be generated by, for example, applying a threshold operation to the respective energies recorded in the spectrogram S[f,b] to generate the audio signature, so as to identify the position of peaks in audio energy within the spectrogram. Any appropriate threshold may be used. For example, assuming that the foregoing matrix S[f,b] represents the spectrogram of the captured audio signal, the mobile device 14 may preferably generate a signature S*, which is a binary F-by-B matrix in which S*[f, b]=1 if S[f,b] is among the P % (e.g. P %=10%) peaks with highest energy among all entries of S. Other possible techniques to generate an audio signature could include a threshold selected as a percentage of the maximum energy recorded in the spectrogram. Alternatively, a threshold may be selected that retains a specified percentage of the signal energy recorded in the spectrogram.

FIG. 3 illustrates a spectrogram 60 of a captured audio signal, along with an audio signature 62 generated from the captured spectrogram 60. The spectrogram 60 records the energy in the captured audio signal, within the defined frequency bands (kHz) shown on the vertical axis, at the time intervals shown on the horizontal axis. The time axis of FIG. 3 denotes frames, though any other appropriate metric may be used, e.g. milliseconds, etc. It should also be understood that the frequency ranges depicted on the vertical axis and associated with respective filter banks may be changed to other intervals, as desired, or extended beyond 25 kHz. Once generated, the audio signature 62 characterizes a segment of a commercial shown on the display device 12 and recorded by the mobile device 14, so that it may be matched to a corresponding segment of a program in a database accessible to either the mobile device 16 or the server 18.

Specifically, either or both of the mobile device 14 and the server 18 may be operatively connected to storage from which individual ones of a plurality of audio signatures may be extracted. The storage may store a plurality of M audio signals s(t), where $s_m(t)$ represents the audio signal of the $m^{th}$ asset. For each asset "m," a sequence of audio signatures $\{S_m{*}[f_n, b]\}$ may be extracted, in which $S_m{*}[f_n, b]$ is a matrix extracted from the signal $s_m(t)$ in between frame n and n+F (corresponding to the signatures generated by the second audio device 14 as described above, in both time and frequency). Assuming that most audio signals in the database have roughly the same duration and that each $s_m(t)$ contains a number of frames $N_{max}>>F$, after processing all M assets, the database would have approximately $MN_{max}$ signatures, which would be expected to be a very large number (on the order of $10^7$ or more). However, with modern processing power, even this number of extractable audio signatures in the database may be quickly searched to find a match to an audio signature 24 received from the second device 14.

It should be understood that, rather than storing audio signals s(t), individual audio signatures may be stored, each associated with a segment of commercial content available to a user of the display 12 and the mobile device 14. In another embodiment, individual audio signatures may be stored, each corresponding to an entire program, such that individual segments may be generated upon query. Still another embodiment would store audio spectrograms from which audio signatures would be generated.

FIG. 4 shows a spectrogram 64 that was generated from a reference audio signal s(t). This spectrogram 64 corresponds to the audio segment represented by the spectrogram 60 and audio signature 62, generated by the mobile device 14. As can be seen by comparing the spectrogram 64 to the spectrogram 62, the energy characteristics closely correspond, but are weaker with respect to spectrogram 60, owing to the fact that spectrogram 60 was generated from an audio signal recorded by a microphone located at a distance away from a television playing audio associated with the reference signal. FIG. 3 also shows a reference audio signature 66 generated from the reference signal s(t). The audio signature 62 may be matched to the audio signature 66 using any appropriate procedure. For example, expressing the audio signature obtained by the mobile device 14, used to query the database of audio signatures as $S_q{*}$, a basic matching operation could use the following pseudo-code:

```
for m=1,...,M
    for n=1,...,N_max−F
        score[n,m] = < S_m*[n] , S_q* >
    end
end
```

where, for any two binary matrices A and B of the same dimensions, <A,B> are defined as being the sum of all elements of the matrix in which each element of A is multiplied by the corresponding element of B and divided by the number of elements summed. In this case, score[n,m] is equal to the number of entries that are 1 in both $S_m{*}[n]$ and $S_q{*}$. After collecting score[n,m] for all possible "m" and "n", the matching algorithm determines that audio collected by the second device 14 corresponds to the database signal $s_m(t)$ at the delay f corresponding to the highest score[n,m].

Referring to FIG. 5, for example, the audio signature 62 generated from audio captured by the mobile device 14 was matched to the reference audio signature 66. Specifically, the arrows depicted in this figure show matching peaks in audio energy between the two audio signatures. These matching peaks in energy were sufficient to correctly identify the reference audio signature 66 with a matching score of score[n, m]=9. A match may be declared using any one of a number of procedures. As noted above, the audio signature 62 may be compared to every corresponding audio signature in storage, and the stored signature with the most matches, or otherwise the highest matching score using any appropriate algorithm, may be deemed the matching signature. In this basic matching operation, the mobile device 14 or the server 18, as the case may be, searches for the reference "m" and delay "n" that produces the highest score[n,m] by passing through all possible values of "m" and "n."

In an alternative procedure, a search may occur in a predefined sequence and a match is declared when a matching score exceeds a fixed threshold. To facilitate such a technique, a hashing operation may be used in order to reduce the search time. There are many possible hashing mechanisms suitable for the audio signature method. For example, a simple hashing mechanism begins by partitioning the set of integers 1, . . , F (where F is the number of frames in the audio capture and represents one of the dimensions of the signature matrix) into $G_F$ groups, e.g., if F=100, $G_F$=5, the partition would be {1, . . . , 20}, {21, . . . , 40}, . . . , {81, . . . , 100}) Also, the set of integers 1, . . . , B is also partitioned into $G_B$ groups, where B is the number of bands in the spectrogram and represents another dimension of the signature matrix. A hashing function H is defined as follows: for any F-by-B binary matrix S*, HS*=S', where S' is a $G_F$-by-$G_B$ binary matrix in which each entry ($G_F$,$G_B$) equals 1 if one or more entries equal 1 in the corresponding two-dimensional partition of S*.

Referring to FIG. 5 to further illustrate this procedure, the query signature 28 received from the device 14 shows that F=130, B=25, while $G_F$=13 and $G_B$=10, assuming that the grid lines represent the frequency partitions specified. The entry (1,1) of matrix S' used in the hashing operation equals 0 because there are no energy peaks in the top left partition of the reference signature 28. However, the entry (2,1) of S' equals 1 because the partition (2.5,5)×(0,10) has one nonzero entry. It should be understood that, though GF=13 and GB=10 were used in this example above, it may be more convenient to use GF=5 and GB=4. Alternatively, any other values may be used, but they should be such that $2^\wedge\{G_FG_B\}$<<MNmax.

When applying the hashing function H to all $MN_{max}$ signatures in the database, the database is partitioned into $2^\wedge\{G_FG_B\}$ bins, which can each be represented by a matrix $A_j$ of 0's and 1's, where j=1, . . . , $2^\wedge\{G_FG_B\}$. A table T indexed by the bin number is created and, for each of the $2^\wedge\{G_FG_B\}$ bins, the table entry T[j] contains the list of the signatures $S_m{*}[n]$ that satisfies $HS_m{*}[n]=A_j$ is stored. The table entries T[j] for the various values of j are generated ahead of time for pre-recorded programs or in real-time for live broadcast television programs. The matching operation starts by selecting the bin entry given by $HS_q{*}$. Then the score is computed between $S_q$* against all the signatures listed in the entry T[$HS_q$*]. If a high enough score is found, the process is concluded. Alternatively, if a high enough score is not found, the process selects ones of the bins whose matrix $A_j$ has is closest to $HS_q$* in the Hamming distance (the Hamming distance counts the number of different bits between two binary objects) and scores are computed between $S_q$* against all the signatures listed in the entry T[j]. If a high enough score is not found, the process selects the next bin whose matrix $A_j$ is closest to $HS_q$* in the Hamming distance. The same procedure is repeated until a high enough score is found or until a maximum number of searches is reached. The process concludes with either no match declared or a match is declared to the reference signature with the highest score. In the above procedure, since the hashing operation for all the stored content in the database is performed ahead of time (only live content is hashed in real time), and since the matching is first attempted against the signatures listed in the bins that are most likely to contain the correct signature, the number of searches and the speed of the matching process is significantly reduced.

Intuitively speaking, the hashing operation performs a "two-level hierarchical matching"; i.e., the matrix $HS_q$* is used to prioritize which bins of the table T in which to attempt matches, and priority is given to bins whose associated matrix $A_j$ are closer to $HS_q$* in the Hamming distance. Then, the actual query $S_q$* is matched against each of the signatures listed in the prioritized bins until a high enough match is found. It may be necessary to search over multiple bins to find a match. In FIG. 5, for example, the matrix A corresponding to the bin that contains the actual signature has 25 entries of "1" while $HS_q$* has 17 entries of "1," and it is possible to see that $HS_q$* contains "1"s at different entries than the matrix A, and vice-versa. Furthermore, matching operations using hashing are only required during the initial content identification and during resynchronization. When the audio signatures are captured to merely confirm that the viewer is still watching the same commercial, a basic matching operation can be used (since M=1 at this time).

It should be understood that different variations of the foregoing procedures to generate and match audio signatures may be employed by the mobile device 14 and the server 18, respectively. For example, when matching an audio signature captured by the first microphone 16*a* to a reference audio signature of a commercial and downloaded from a remote server 18, the mobile device 14 may apply a relatively high threshold of matching peaks to declare a match, owing to the fact that there are a large number of signatures in storage that could be a potential match, and the importance of obtaining accurate synchronization to subsequent steps. Conversely, when matching a received second query signature of a viewer singing along with a commercial to a reference signature of a person singing a song in a commercial, a more relaxed threshold may be used to accommodate for variations in skill of viewers. Moreover, because the server 18 already knows what commercial is being played (because a match to the commercial has already been made), the server 18 need only score the performance, rather than make an accurate match to one of many different songs in a database. One possible technique to score the viewer's performance would be to generate a first score component based on the viewer's timing, by finding the temporal segment of the relevant reference audio signatures in the set 20*b* that has the highest number of matching peaks, disregarding the synchronization information sent by the mobile device 14. In other words, where each reference performance of a person singing a song appearing in a commercial, is represented in the database 19 by a sequence of temporally offset signatures of a given duration, and knowing which sequence of signatures is associated with a query signature of a viewer singing the song using an identifier received from the mobile device 14, the server 18 may find the offset that best matches the viewer's performance and compare that offset to the synchronization information received from the mobile device 14 to see how closely the viewer is matching the timing of the song in the commercial. A second score component may be based on the number of matching peaks at the optimal offset, representing how well the viewer's pitch matches that of the song in the commercial. These components may then be added together, after appropriate weighting, if desired. Alternatively, no timing component may be used, and relative pitch matching forms the sole basis for the score. In one embodiment, different scoring techniques may be available to a viewer and selectable by a user interface in the application. In another similar embodiment, successive levels of scoring are applied to sequential reiterations of the same commercial, such that, as a viewer sings along to a commercial repeatedly over time, the scoring becomes stricter.

It should also be understood that many variations on the foregoing system and procedures are possible. As one example, a system 10 may not include a user pre-downloading a set of reference audio signatures from the set 20*a* to be matched by the mobile device 14, but instead, all captured audio signatures may be sent to the server 18 for matching, synchronization, and scoring. As another example, the database 19 may store, for each song appearing in a given commercial, a number of reference sets of audio signatures, each reference set sung by a person of a different demographic (e.g. a male and a female reference performer, etc.) such that the server 18 may, upon query, first find the set that best matches and presume that the viewer is among the demographic associated with the best match (gender, age group, etc), and then score the performance as described earlier. As another example, the mobile device 14 can download not only the audio signatures of the set 20*a*, but the set 20*b* as well, and all steps may be performed locally. In this vein, the mobile device 14 preferably updates any downloaded signatures on a periodic basis to make sure that the signatures stored in the database are current with the commercial content currently available. In this case, the scoring operation is performed solely in the mobile device 14. To generate the score, mobile device 14 may either reuse the matching operation of steps 34 and 36 using different configuration parameters, or may use a completely different matching algorithm.

Preferably the same technique used to generate reference audio signatures of a commercial is used to generate a query audio signature of an audio signal received by a display 12 presenting commercial content, and similarly, the same technique used to generate a reference audio signature of a person singing a song in a commercial is used to generate a query audio signature of a viewer singing along to a commercial, in order to maximize the ability to match such signatures. Furthermore, although some embodiments may use different core algorithms to generate audio signatures of commercial audio than those used to generate audio signatures of individuals singing songs within the commercials, preferably these core algorithms are identical, although the parameters in the core algorithm may differ based on whether the signature is of a person signing, or of a commercial. For example, parameters of the core algorithm may be configured for voice captures (with a limited frequency range) when generating an audio signature of a person singing, but configured for instrumental music with a wider frequency range for audio from a commercial.

Furthermore, although the preferable system and method generates reference signatures of a song in a commercial sung by a person or persons from the target audience, one alternative embodiment would be to generate such reference signatures by reinforcing voice components of audio of songs appearing in commercials, or if the commercial audio is recorded using separate tracks, e.g. vocal, guitar, drum, etc., simply using the vocal track as a reference audio signature of a person singing the song.

Figure 6:
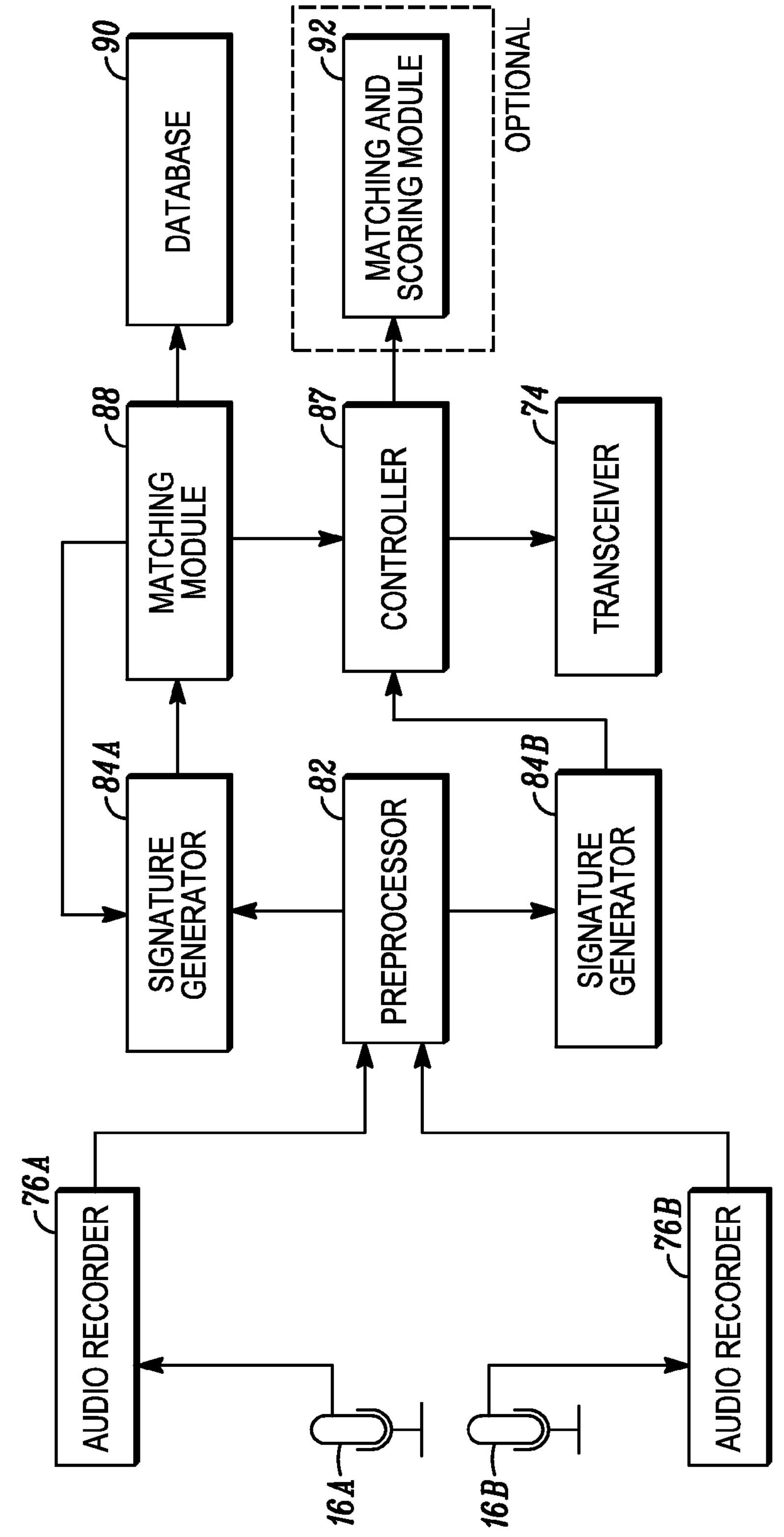
FIG. 6 shows a system that implements a second technique for receiving audio from a user viewing interactive content and generating a response based on that audio.

The system implemented by FIG. 2 presumes that synchronization occurs during a first mode of operation, after which a second mode of operation begins and audio from a user begins to be captured. One potential drawback of such a system is that synchronization may take a while and a user may begin singing before the microphone that captures the audio is activated, and such singing may even interfere with the synchronization process, exacerbating the delay in synchronization. FIG. 6 depicts an alternate system capable of simultaneously capturing a viewer's singing performance and synchronizing a commercial to a reference signature in a database. In particular, a system 70 may include a mobile device 14 operatively communicating to a server through a transceiver 74. The mobile device 14 may include microphones 16*a* and 16*b*, each connected to an audio recorder 76*a* and 76*b* together capable of simultaneously recording audio from the respective microphones 16*a* and 16*b*. Thus, the system 70 is capable of capturing audio of a user singing, from microphone 16*b*, while the system synchronizes audio from the commercial to a reference audio signature using an audio signal from the microphone 16*a*. It should be understood that the audio recorders 76*a* and 76*b* may comprise the same processing components, recording respective audio signals by time division multiplexing, for example, or alternatively may comprise separate electronic components.

The microphone 16*a* is preferably configured to receive audio primarily from a direction facing away from a viewer, i.e. toward a display 12, while the microphone 16*b* is preferably configured to receive audio from a direction primarily from the viewer. Audio from both the microphones 16*a* and 16*b* are forwarded to the pre-processor 82. The main function of the pre-processor 82 is to separate the audio coming from the display 12 from the audio coming from the viewer. In the preferred embodiment, the pre-processor 82 performs this function through well-known blind source separation techniques that use separate multiple input streams to separate multiple independent sources, such as those disclosed in "Independent Component Analysis", by A. Hyvarinen, J. Karhunen, and E. Oja, Published by John Wiley & Sons, 2001. In another embodiment, not represented in FIG. 6, the pre-processor 82 would use blind source separation techniques before the mobile device 14 reaches synchronization with the content in display 12. Then, after the content is identified and synchronization is reached, the pre-processor 82 would use source separation techniques using knowledge of the audio content identified and, for this purpose, the mobile device 14 would download the actual audio stream of the identified content. The pre-processor 82 also perform other functions designed to prepare the audio signal for signature extraction by the signature generators 84*a* and 84*b*. As one example, the pre-processor 82 may be configured to reduce noise and/or boost the output signal to the signature generator 84*a* on the assumption that the audio from the television has a low SNR ratio. As another example, the pre-processor 82 may be configured to emphasize speech in the output signal to the signature generator 84*b* by filtering out frequencies outside the normal range of the human voice, etc.

The pre-processor 82 sends the processed and separated audio received from the display 12 to the audio signature generator 84*a* and the produced signature is forwarded to a matching module 88 connected to a database 90 that hosts reference audio signatures that are preferably pre-downloaded from server 18. The matching module 88 uses the received query audio signatures to search the database 90 for a matching reference audio signature. Once found, the matching module sends the identified content to the Controller 87, which also receives the query audio signatures produced by the signature generator 84*b* (the query audio signatures of the viewer singing) and forwards the information to the transceiver 74, so that the transceiver 74 may forward the query audio signature produced by the signature generator 84*b* to a server, along with synchronization and identification information, so that the server may score the viewer's performance and return that score to the mobile device 14, as previously described. In an alternative embodiment, the scoring generation is done in the mobile device 14 itself. In this embodiment, the mobile device 14 would have a Matching and Score Module 92, which would receive the query audio signature produced by the signature generator 84*b* along with synchronization and identification information from the Controller 87. The matching and Score Module 92 would then use reference audio signatures that are preferably pre-downloaded from server 18 to compare and score the query audio signature produced by the signature generator 82*b*. Note that the reference audio signatures used by the Matching and Score Module 92 are reference signatures of users and are different than the reference signatures used by the Matching Module 88.

In an alternative embodiment, the pre-processor 82 does not attempt to separate the signal coming from the viewer and the signal coming from the display 12. In this embodiment, the pre-processor 82 attempts to determine the time periods in which the viewer is not singing. This can be accomplished by observing the energy coming from the microphone 16*b*, which is directed to the viewer. During periods where the viewer is not singing, the audio signal into the Pre-processor 82 from microphone 16*b* should therefore be very weak, and conversely, the audio signal into the pre-processor 82 from microphone 16*b* should not be very weak when the user is singing, etc. Such variation in energy happens in words and even between syllables. By observing such variations in energy, the pre-processor 82 is able to determine the time periods in which the audio coming from the microphone 16*a* contains only audio coming from the display 12. The pre-processor 82 therefore modulates the signature generator 84*a*, such that query audio signatures are only generated for those intervals in which the user is deemed to be not singing. Furthermore, the pre-processor 82 nullifies the audio stream sent to the signature generator 84*b* during these intervals to avoid having the signature generator 84*b* consider the audio from the display 12 as being generated by the viewer. Similarly, the pre-processor 82 modulates the signature generator 84*b* such that signatures from the signing performance are only generated for intervals in which the user is deemed to be singing; during these intervals, the signature generator 84*a* would not generate a signature and matching module 88 would not attempt a matching operation. In other words, in this embodiment, the query audio signature of the viewer singing and sent to the server may be generated based solely on intervals determined by the Pre-processor 82 to include audio of the viewer singing. In other embodiments, the mobile device 14 may modulate activation of the two microphones 16*a* and 16*b* so that microphone 16*a* is only activated when microphone 16*b* is not outputting a threshold amount of audio energy. Additionally, in embodiments where the mobile device 14 has downloaded reference signatures of individuals singing the vocal track of a melody in a commercial, the mobile device 14 may alternate activation of microphones 16*a* and 16*b* based on when the reference vocal track indicates a viewer should be singing.

One benefit of the system 70 is that audio of a person singing along to a song in a commercial may be recorded and processed during the synchronization procedure, and before a match to a reference signature of a commercial's audio is made, and thus the system 70 is capable of generating query audio signatures of a viewer singing that are more likely to be accurately scored given that the audio signature of the user singing is more likely to be complete. It should be understood that, because audio of the commercial and audio from a viewer singing are recorded simultaneously, the signatures generated by the generators 84*a* and 84*b* are generated in a synchronized manner; e.g., each signature generator generates one signature per second. Then, as soon as the matching module 88 identifies the content and the time offset within the content, the time offset is sent by the Controller 87 to the server 18, which uses the same time offset to the sequence of signature generated by the generator 84*b*. Through this process, the mobile device 14 may synchronize an audio signature of a user singing to a reference audio signature of a commercial displayed to the viewer.

Furthermore, variations of the mobile device schematically depicted in FIG. 2 or FIG. 6 may utilize only a single microphone. In such a case, the resulting audio signal and/or audio signatures can be analyzed to determine which intervals represent periods where a user is singing, and on that basis, generate first and second component signatures, the first component signature excluding or nullifying periods where a user is singing, and the second component either being unmodified from the original signature, or nullifying/excluding intervals where the user is not singing. Techniques for analyzing a spectrogram of an audio signal or a sequence of energy levels received from the single microphone to determine which portions reflect audio from a viewer of that display, along with techniques for generating audio signatures that nullify selective intervals of that audio signature so as to accurately match those audio signatures to reference signatures in a database, are extensively disclosed in co-pending application Ser. No. 13/794,753 entitled "Signature Matching of Corrupted Audio Signals, " filed Mar. 11, 2013, naming inventors Benedito Fonseca, Jr., et al., the disclosure of which is incorporated by reference in its entirety into the present disclosure. Where only a single microphone is used, the mobile device 14 may use separate preprocessing algorithms to extract the signatures representing the user singing and the commercial audio, respectively.

Many variations on the disclosed techniques are possible. For example, these techniques may be modified to allow the user to sing a melody in a commercial from memory after the commercial is finished, and score the performance, in which case matching criteria could be loosened. Similarly, these techniques could be extended to permit individuals to simulate instrumentals and sound effects in commercials, particularly if multiple viewers of a display each have their own mobile device 14 that has instantiated an application described in this disclosure. In a similar vein, in embodiments permitting multiple users of devices 14 to interact simultaneously with a commercial commonly viewed, each device 14 may capture the audio of its respective user and scores it separately so as to permit either cooperative interactivity, such as adding scores, or competitive interactivity, such as comparing scores, with the commercial. In some embodiments, a headset may be worn by the user (or any one of the users where joint interaction is available), allowing improved audio source separation.

Also, in some embodiments, rather than providing a score to a user based on their performance, additional commercial content may be provided to the user, i.e. extending a commercial. For example, if a user is watching content over-the-top, using chunk-based protocols such as HTTP Live streaming, the sequence of chunks that are downloaded can be changed for presentation to a viewer. Thus, if a user is singing along a commercial, the device 14 could download different (or additional) advertisement chunks. Or, the different or additional advertisement chunks could be sent only if the viewer reaches a high enough score, motivating viewers to watch again the advertisement and try to watch the additional advertisement chunk. Also, additional incentives or rewards could be given to viewers based on their interactions with commercials, such as virtual badges or medals that could be posted on social networking sites, receiving coupons or other discounts for advertised products, receiving invitations to participate in nationwide, televised contests or as a participant in a future commercial, etc.

Although the foregoing disclosure was described with reference to an individual activating the disclosed application when the user recognized that an advertisement or program was interactive, or was notified by some on-screen icon of such interactivity, other possible applications may download timetables of broadcast content and advertisement schedules so that the application knows when an interactive commercial is to be broadcast, and may automatically start procedures at such scheduled times, alerting the user in the process. Such applications may have configurable settings allowing the user to select whether audio recording may begin automatically or only with the permission of the viewer. Furthermore, the described applications may be left running, and may periodically activate microphone 16*a* to generate audio signatures of viewed content, and forward them to a server for identification, so that the application can identify which program and channel a viewer is watching and whether an interactive commercial is soon to be presented. Once the commercial starts, the microphone 16*b* may be activated to collect the viewer's singing. A visual or audible indication to the viewer might also be generated by the mobile device. The application may also terminate its processes if it determines that a user is not interacting with a commercial.

Another possible variation would be an "instant-record" embodiment, where the device 14 captures audio from the user and from the display upon activation by the user, and once the user stops the capture, the application can show a menu of installed sing-along applications, and when a user selects one, the recordings are provided to the selective application for processing, i.e. synchronization and scoring. Alternatively, the recordings could be forwarded to one or more servers of different companies/third party operators, where any which find a match can process and score the performance and return the results. This variation would redress a situation where the user does not have time to locate and launch an application for a commercial being presented until too late.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A device comprising:

at least two microphones collectively capable of simultaneously receiving audio from a user and receiving audio broadcast by a presentation device proximate said user, the at least two microphones comprising a first microphone and a second microphone, where audio received by said first microphone is used to cancel at least a portion of audio received by said second microphone;

a first signature generator that generates a first audio signature representing said audio from said presentation device, and a second signature generator that generates a second audio signature representing said audio from said user, said first audio signature generated based on said audio from said user;

a matching module that uses said first audio signature to match said first audio signature to a first reference audio signature;

a synchronizer that synchronizes said second audio signature to said first reference audio signature; and a display capable of displaying a score, where said score is based on comparing said second audio signature to at least one second reference audio signature.

2. The device of claim 1 where said matching module selects said first reference audio signature from among a plurality of reference audio signatures using a matching algorithm having a first set of at least one parameter.

3. The device of claim 2 where said score is based on a second matching module that selects said second reference audio signature from among a plurality of reference audio signatures using a matching algorithm having a second set of at least one parameter, said second set being more relaxed than said first set.

4. The device of claim 1 where said score is based on synchronization information determined by said synchronizer.

5. The device of claim 1 having a preprocessor operably between said first microphone and said first signature generator, where said preprocessor enhances vocals.

6. The device of claim 1 having a preprocessor operably between said second microphone and said second signature generator, where said preprocessor enhances signals having a low SNR ratio.

7. The device of claim 1, further including a transmitter that sends said first audio signature to a remote server, and a receiver that receives said score from said remote server.

8. The device of claim 7 where said matching module selects said first reference audio signature from among a plurality of reference audio signatures downloaded from said remote server.

9. The device of claim 1 where said score is used to selectively modify a presentation comprising said audio broadcast.

10. The device of claim 1 where at least one of the said at least two microphones is periodically activated to determine whether said user is providing audio to generate the said first audio signature.

11. A method comprising:

receiving with a processing device first and second audio signals occurring simultaneously, said first audio signal originating from a presentation device proximate said user and said second audio signal originating from a user;

from said first and second audio signals, generating a first data structure representative of audio from said presentation device and generating a second data structure representative of audio from said user;

matching said first data structure to a first reference data structure;

synchronizing said second data structure to said first reference data structure;

comparing said second data structure to at least one second reference data structure;

scoring said audio from said user based on said comparison; and performing an action based upon said scoring.

12. The method of claim 11 where said first and second data structures are generated by determining which portions of said simultaneously received first and second audio signals represent audio from said first and second audio sources, respectively.

13. The method of claim 11 where at least one of said first and second data structures is a set of audio samples.

14. The method of claim 11 where at least one of said first and second data structures is an audio signature.

15. The method of claim 11 where at least one of said first and second reference data structures is a set of audio samples.

16. The method of claim 11 where at least one of said first and second reference data structures is an audio signature.

17. The method of claim 11 where said first and second audio signals are recorded by first and second microphones, respectively.

18. The method of claim 17 including the step of periodically deactivating said first microphone based on the amount of energy in said second audio signal from said second microphone.

19. A method comprising:

receiving a signal comprising audio from a presentation device proximate a viewer, intermixed with audio from said viewer;

processing said signal to identify a first component of said signal, said first component comprising at least one interval in said signal not including said audio from said viewer;

using said first component of said signal to match said signal to a first reference audio signature;

using the matched said first reference audio signature to identify a second reference audio signature and synchronizing at least a portion of said signal to said second reference audio signature;

generating a score for said audio from said viewer based on comparing said at least a portion of said signal to the synchronized said second reference audio signature; and displaying said score to said viewer.

20. The method of claim 19 including the step of identifying a second component of said signal, said second component comprising at least one interval in said signal including said audio from said viewer, and where said score is based on comparing said second component to said second reference audio signature.

21. The method of claim 19 where said signal is received by a first microphone configured to receive audio primarily from a direction away from said viewer, and said first component is identified using a second signal received by a second microphone configured to receive audio primarily from a direction toward said viewer.

22. The method of claim 19 where said first component is matched to said first reference audio signature by nullifying portions of said signal not included in said at least one interval.

* * * * *